Patented Jan. 1, 1935

1,986,067

UNITED STATES PATENT OFFICE 1,986,067

UREA CONDENSATION PRODUCT AND PROCESS OF PREPARING IT

Max Paquin, Konigstein-on-the-Taunus, Germany, assignor to I. G. Farbenindustrie Aktiengesellschaft, Frankfort - on - the - Main, Germany, a corporation of Germany No Drawing. Original application September 30, 1927, Serial No. 223,232. Divided and this application August 31, 1928, Serial No. 303,367. In Germany October 4, 1926

12 Claims. (Cl. 260—3)

My present invention relates to condensation products from an amidocarbonic acid derivative and an alcohol and a process of preparing them.

It is known that urea or its derivatives when treated with an alcohol or a ketone, or a derivative thereof, are transformed into well-defined crystalline compounds.

As I have set forth in my copending U. S. application Serial No. 223,232 when working under suitable conditions and using lower aliphatic, aliphatic-aromatic or hydroaromatic alcohols the reaction in question not only leads to the formation of the compounds above referred to, but in its further progress to the formation of amorphous products the term "lower aliphatic alcohols" being intended to exclude the higher aliphatic alcohols, such as sugar or starch. These products may be of a viscous liquid to resinous character.

Condensation products are accordingly obtained when causing to act upon each other at temperatures between about 0° and 300° C., especially between 0° and 100° C. an amidocarbonic acid derivative of the following constitution

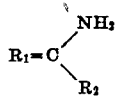

wherein $R_1$ stands for oxygen or sulfur, $R_2$ for $NH_2$, NH-acyl, O-alkyl or O-aryl and a compound containing an alcoholic hydroxy group, such as benzyl alcohol, cyclohexanol and its homologues, aminoalcohols, for example, triethanol amine, glycerol and the partially esterified or etherified derivatives thereof, glycols and their derivatives, etc.

The amorphous condensation products obtainable by my new process, which appear to be substantially a mixture of urethanes and imino dicarboxylic acid ester, are water-soluble, if their alcohol content is water-soluble, and if for the starting material pure urea is used. However, if water-insoluble alcohols are acted upon with urea or water-soluble alcohols acted upon with water-insoluble urea derivatives, there are generally obtained water-insoluble products.

I have found further that in the reaction of the two components there may also participate other substances not derived from urea but containing an amine group. They are simultaneously transformed by the reaction and similar amorphous, oily or resinous products are produced.

The cited products resulting from the reaction between the ureas and alcohols or ketones and also those obtained in presence of amino compounds not derived from urea, can be brought to reaction with any aldehyde at temperatures between about 30° C. and 200° C. When using formaldehyde for instance there are obtained, according to the duration, the intensity and the quantity of formaldehyde subjected to the reaction, amorphous products of a liquid viscous or resinous consistency.

The above described products can be used for a great variety of purposes, for instance they may be employed as softening agents for cellulose esters or cellulose ethers, moreover as a substitute for natural or artificial (synthetic) resins of every kind and similar substances. In an analogous manner the products in question may be utilized for substances which swell up in water, in particular albuminous substances to be used for elastification and hardening purposes. Some of the products in question exercise a peculiar effect on lacquers from nitrocellulose, namely by preventing them from becoming gelatinized and assuming a green color which occurs when metal bronzes containing copper are present.

The following examples serve to illustrate my invention but they are not intended to limit it thereto, the parts being parts by weight.

1. 100 parts of the oily product obtained by heating a mixture of 240 parts of ethylene glycol and 96 parts of thiourea at 190° C.-200° C. for 1 hour and a half are boiled in the reflux apparatus with 75 parts of formaldehyde of 30% strength until the smell of formaldehyde has become very weak, which is the case after about 6 hours. The water contained in the product is extracted and thus a very viscous, limpid mass is obtained which, when strongly heated, splits off formaldehyde.

2. 100 parts of the oily product obtained by boiling for 2 hours 200 parts of butylene glycol with 80 parts of urea and 60 parts of acetylaniline, are mixed with 30 parts of para-formaldehyde and heated to 70° C. to 80° C. while stirring. After 4-5 hours, the reaction is complete and a clear extremely viscous mass is obtained which, on being strongly heated, splits off formaldehyde.

3. 100 parts of the resin obtained by boiling for 1 hour and a quarter 327 parts of cyclohexanone with 200 parts of urea at temperatures up to 260° C.-270° C. are boiled for 6 hours in the reflux apparatus with 70 parts of formaldehyde of 30% strength. The water contained in the product is expelled and thus a limpid resin is obtained which can be used for technical purposes.

4. 100 parts of the oily product obtained from glycol and urea are boiled in a reflux apparatus with 65 parts of benzaldehyde for 4 hours. The constituents unite with elimination of water. The oily benzyl compound thus obtained can be purified by vacuum distillation.

5. 100 parts of the oily product obtained from benzylglycol and urea are boiled in a reflux apparatus for 5 hours with 48 parts of crotonic aldehyde and 15 parts of anhydrous potassium bisulfate. Thereupon the pungent smell has disappeared and the resulting crotonic compound can be purified by vacuum distillation.

This application is a division of my co-pending U. S. patent application Ser. No. 223,232 filed September 30, 1927.

I claim:

1. The process of preparing condensation products which comprises causing ethylene glycol to act upon thiourea and then causing formaldehyde to act upon the condensation product thus obtained.

2. The process of preparing condensation products which comprises causing butylene glycol to act upon urea and acetylaniline and then causing para-formaldehyde to act upon the condensation product thus obtained.

3. The condensation product obtainable by the process set forth in claim 1, said product being of a viscous liquid to resinous character and suitable for being employed for instance as softening agent for cellulose ethers or cellulose esters.

4. The condensation product obtainable by the process set forth in claim 2, said product being of a viscous liquid to resinous character and suitable for being employed for instance as softening agent for cellulose ethers or cellulose esters.

5. The process which comprises reacting an amido carbonic acid derivative of the following formula

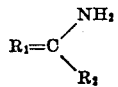

wherein $R_1$ stands for oxygen or sulfur, $R_2$ for $NH_2$, NH-acyl, O-alkyl or O-aryl and an excess of an alcohol in the absence of an aldehyde under such conditions as to form an oily or resinous condensation product and then causing an aldehyde to react with the condensation product thus obtained at a temperature between about 30° C. and about 200° C.

6. The process which comprises reacting an amido carbonic acid derivative of the following formula

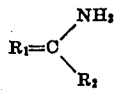

wherein $R_1$ stands for oxygen or sulfur, $R_2$ for $NH_2$, NH-acyl, O-alkyl or O-aryl, an excess of an alcohol and another amino compound not derived from urea in the absence of an aldehyde under such conditions as to form an oily or resinous condensation product and then causing an aldehyde to react with the condensation product thus obtained at a temperature between about 30° C. and about 200° C.

7. The process which comprises reacting urea and an excess of an alcohol in the absence of an aldehyde under such conditions as to form an oily or resinous condensation product and then causing formaldehyde to react with the condensation product thus obtained at a temperature between about 30° C. and about 200° C.

8. The process which comprises reacting thiourea and an excess of an alcohol in the absence of an aldehyde under such conditions as to form an oily or resinous condensation product and then causing formaldehyde to react with the condensation product thus obtained at a temperature between about 30° C. and about 200° C.

9. The condensation products obtainable by the process set forth in claim 5, said products being of viscous liquid to resinous character and suitable for being employed as softening agents for cellulose ethers or cellulose esters.

10. The condensation products obtainable by the process set forth in claim 6, said products being of viscous liquid to resinous character and suitable for being employed as softening agents for cellulose ethers or cellulose esters.

11. The condensation products obtainable by the process set forth in claim 7, said products being of viscous liquid to resinous character and suitable for being employed as softening agents for cellulose ethers or cellulose esters.

12. The condensation products obtainable by the process set forth in claim 8, said products being of viscous liquid to resinous character and suitable for being employed as softening agents for cellulose ethers or cellulose esters.

MAX PAQUIN.